United States Patent [19]

Bridge

[11] 4,376,621
[45] Mar. 15, 1983

[54] METHOD AND APPARATUS FOR TUBE EXTRUSION

[75] Inventor: William A. Bridge, Midland, Mich.

[73] Assignee: The Dow Chemical Company, Midland, Mich.

[21] Appl. No.: 908,347

[22] Filed: May 22, 1978

Related U.S. Application Data

[63] Continuation-in-part of Ser. No. 783,251, Mar. 31, 1977, abandoned.

[51] Int. Cl.³ ............................................. B29C 17/00
[52] U.S. Cl. .................................. 425/72 R; 264/565; 264/566; 425/73; 425/326.1; 425/327; 425/388
[58] Field of Search ............... 264/95, 89, 90, 209, 264/290 R, 566, 565, 209.1; 425/72 R, 326.1, 73, 388, 327

[56] References Cited

U.S. PATENT DOCUMENTS

| | | | |
|---|---|---|---|
| 2,452,080 | 10/1948 | Stephenson | 264/95 |
| 3,051,605 | 8/1962 | Stannard | 264/95 |
| 3,258,516 | 6/1966 | Ewing, Jr. | 264/209 |
| 3,363,035 | 1/1968 | Niiho et al. | 264/95 |
| 3,370,112 | 2/1968 | Wray | 264/95 |
| 3,544,667 | 12/1970 | Ebert et al. | 264/95 |
| 3,619,442 | 11/1971 | Henderson | 264/95 |

Primary Examiner—Jeffery R. Thurlow
Attorney, Agent, or Firm—R. B. Ingraham

[57] ABSTRACT

Reduced breakage and reduced internal gas pressure is achieved in the trapped bubble process for the preparation of film by applying vacuum to the region of the tube where the bubble starts to form.

1 Claim, 3 Drawing Figures

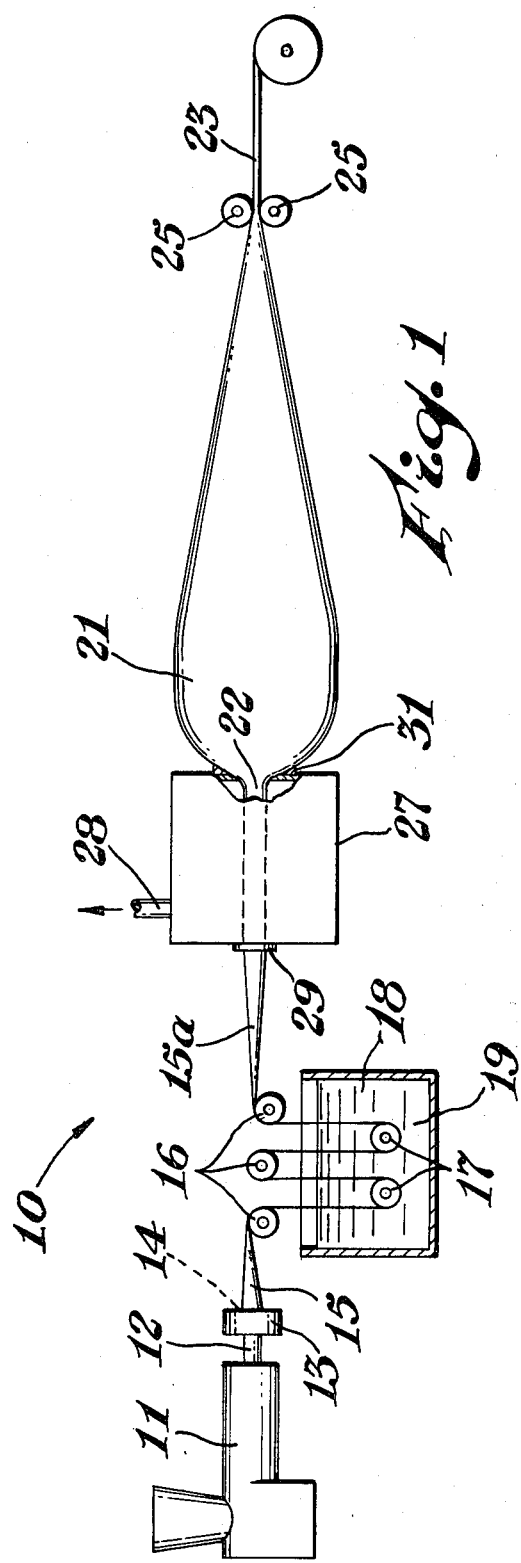
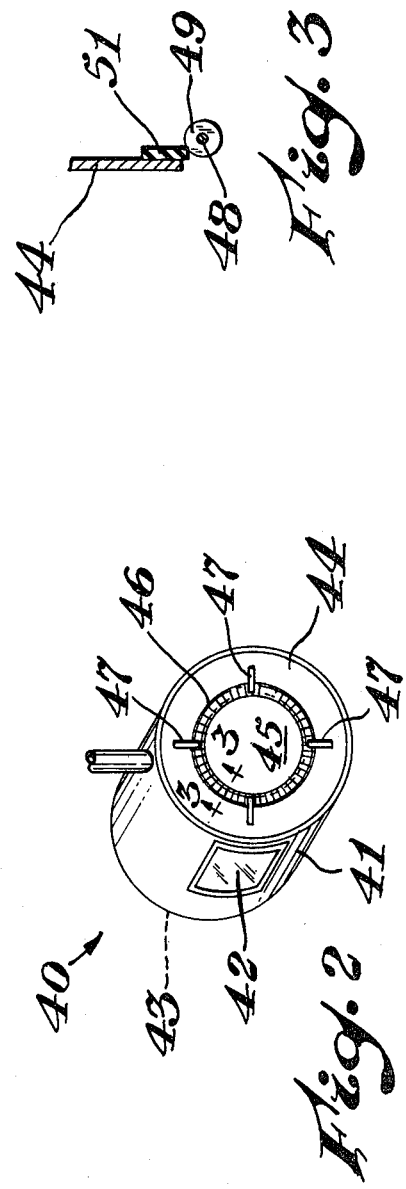

METHOD AND APPARATUS FOR TUBE EXTRUSION

This application is a continuation-in-part of application Ser. No. 783,251 filed Mar. 31, 1977 now abandoned.

In the preparation of plastic film by the trapped bubble process wherein a stretchable plastic tube is expanded by being passed over a trapped volume of gas, one of the major difficulties is rupture of the bubble. Each time the trapped bubble ruptures, substantial time and effort is required to restoring the bubble of film. Production line breaks also cause discontinuities in rolls of film which oftentimes is a significant disadvantage to the user. Bubble breaks are often attributed to foreign matter in the resin of the extruder. Such foreign matter may be solid, liquid or gaseous and when such foreign material is extruded within a tube, a weaker portion of the tube exists which on stretching oftentimes ruptures to create a bubble break.

It would be desirable if there were available an improved method and apparatus for the extrusion of plastic tube employing the trapped bubble process.

It would also be desirable if there were available an improved method and apparatus for the extrusion of plastic film by the trapped bubble process which would result in reduced pressure within the bubble.

These benefits and other advantages in accordance with the present invention are achieved in a process for the extrusion and stretching of synthetic resinous thermoplastic tube wherein a synthetic resinous thermoplastic tube is extruded and maintained at a stretching temperature, the tube passed over a trapped volume of gas to stretch the tube to a larger diameter and reduced wall thickness, subsequently collapsing the tube and winding onto a roll, the improvement which comprises applying to the tube at least at a location where the extruded tube starts to stretch over the trapped volume of gas, a reduced atmospheric pressure to thereby promote initial stretching of the extruded tube thereby resulting in a reduced pressure within the tube and giving rise to fewer ruptures of the tube.

Also contemplated within the scope of the present invention is an apparatus for the production of synthetic resinous thermoplastic tube, the apparatus comprising in cooperative combination a source of heat-plastified synthetic resinous film-forming material in operative combination with an annular tubing die adapted to extrude a heat-plastified stretchable tube of the synthetic resinous material, at least one pair of nip rolls in opposed spaced relation to the extrusion die, the nip rolls being adapted to receive and collapse a stretched heat-plastified tube from the extrusion orifice and maintain gas trapped therein, the improvement which comprises means to provide a subatmospheric pressure to a tube being extruded and stretched over a trapped volume of gas disposed between the extrusion orifice and the nip rolls, the subatmospheric pressure being applied at least at a region of initial stretching of the tube to form a trapped bubble.

Further features and advantages of the present invention will become more apparent from the following specification taken in connection with the drawing wherein:

FIG. 1 is a schematic sectional view of an apparatus in accordance with the invention;

FIG. 2 is a view of a vacuum chamber suitable for use for the apparatus of FIG. 1; and FIG. 3 is a fractional sectional view of a seal of FIG. 2 taken along the line 3—3 thereof.

In FIG. 1 there is schematically depicted a tube extrusion apparatus in accordance with the present invention generally designated by the reference numeral 10. The apparatus 10 comprises in cooperative combination a source 11 of heat-plastified extrudable film-forming synthetic resinous stretchable material. The source 11 beneficially is a conventional extruder. The source 11 has a discharge conduit 12 in operative combination with a tubing die 13 having an annular extrusion orifice 14. A heat-plastified extruded tube 15 is issuing from the die 14. The tube 15 passes to a plurality of rolls 16 and 17 thereby contacting the extruded flattened tube with a temperature control liquid 18 contained in the bath 19. The tube 15 on leaving the roll 16 most remote from the die 13 is inflated to a cylindrical configuration at location 15a. The tube 15 then passes over a volume of trapped air to biaxially stretch the tube to form a bubble 21. The bubble 21 has a head or leading portion 22 and a collapsed or flattened trailing portion 23. A pair of nip rolls 25 remotely disposed from the die 13 serve to collapse the bubble 21a into flattened form 23. The head of the bubble 22 is that portion of the tube 15 where stretching first occurs and the diameter of the tube starts to increase before reaching maximum diameter such as is attained at the location indicated by the lead line of the reference numeral 21. A vacuum chamber 27 of hollow annular configuration is disposed externally to, or about tube 15 generally adjacent the die 13 and at the head end 22 of the bubble 21. The vacuum chamber is connected by means of conduit 28 to a vacuum chamber not shown. A gas sealing means 29 surrounds an opening in the end of the vacuum chamber 27 adjacent the extruder 11 and a second gas seal 31 is disposed about the open end of the chamber 27 adjacent the head end of the bubble and remote from the extruder 11. The vacuum chamber applies vacuum only to the head of the bubble and a portion of the tube 15a adjacent the source.

In FIG. 2 there is schematically depicted a view of a vacuum chamber suitable for the practice of the present invention. The vacuum chamber is generally designated by the reference numeral 40. The chamber 40 has a generally cylindrical wall 41 having disposed therein an observation port 42. The chamber 40 has a tube entrance end 43 and a tube exit end 44. The ends 43 and 44 are generally planar. The end 44 defines a tube exit passage 45 having disposed thereabout a gas seal 46. The gas seal 46 is maintained in position by means of a plurality of brackets 47. The gas seal 46 comprises a generally circular bearing rod supported by the brackets 47 and a plurality of rolls 49 of generally equal size rotatably supported on the circular rod wherein the axes of the rolls 49 lie in a plane generally normal to the axis of the tube to be stretched. Advantageously the rolls are made of a low friction material such as polytetrafluoroethylene, nylon or the like. A like seal may be disposed on the end 43 of a vacuum chamber such as the vacuum 40 of FIG. 2, however, it has been found that a rubber sheet having a circular opening provides a satisfactory seal for the entry end of the chamber.

In FIG. 3 there is depicted a fractional sectional view of the seal 46 showing a circular shaft or rod 48 on which there are disposed a plurality of rolls 49 and adjustable, flexible seal member 51 is disposed generally between the rolls and the end 44 in order to minimize gas flow.

Employing an apparatus generally as depicted in FIG. 1 and using a vacuum chamber such as depicted in FIG. 2, a tube of a vinylidene chloride-vinyl chloride polymer composition of about 85 parts by weight vinylidene chloride and about 15 parts by weight vinyl chloride containing various additives was extruded to form a tube having a diameter of about two inches which was subsequently stretched over a trapped volume of air to form a tube having a diameter of about 11 inches. The tube was subsequently collapsed in the manner depicted in FIG. 1. The vacuum chamber measured 20 inches in diameter and was 32 inches in length. At the entry end, a gas seal was formed of a sheet of red silicone rubber which had a centrally disposed opening of about 2 inches in diameter. The vacuum seal at the exit end of the chamber used rolls of about 0.5 inch in diameter and the opening had a diameter of 5 inches. The vacuum chamber was connected to a 5 horsepower American blower by means of a three-inch flexible tube and the vacuum chamber was supported from above by ropes in such a manner that the chamber could move along the axis of the extruded tube as well as laterally. When a vacuum of 1.65 inches was drawn on the chamber, the internal bubble pressure was reduced from about 15 inches of water to 11.5 inches of water and the bubble diameter from about 11 and $\frac{1}{8}$ inches to about 10 and $\frac{5}{8}$ inches and the length of the bubble increased from about 95 inches to about 105 inches.

In a manner similar to the foregoing, other film-forming synthetic resinous extrudable plastic tubes which are processed by the trapped bubble process may be employed wherein reduced internal gal pressure is obtained by providing a reduced external gas pressure about a region where the extruded tube begins to expand.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An apparatus for the production of synthetic resinous thermoplastic tube, the apparatus comprising in cooperative combination a source of heat-plastified synthetic resinous film-forming material in operative combination with an annular tubing die adapted to extrude a heat-plastified stretchable tube of the synthetic resinous material, at least one pair of nip rolls in opposed spaced relation to the extrusion die, the nip rolls being adapted to receive and collapse a stretched heat-plastified tube from the extrusion orifice and maintain gas trapped therein to thereby form a bubble having a head end generally adjacent the extrusion die, the improvement which comprises means to provide a subatmospheric pressure externally to a tube being extruded and stretched over a trapped volume of gas disposed between the extrusion orifice and the nip rolls, the means to provide a subatmospheric pressure being disposed between the head end of the bubble and the die, the subatmospheric pressure being applied only to a region of initial stretching of the tube to form a trapped bubble and unstretched tube whereby the subatmospheric pressure promotes initial stretching of the tube; wherein the means to provide a subatmospheric pressure comprises a chamber having a first or entry end and a second or exit end and a gas seal at each end, the gas seal at the exit end comprising a plurality of circularly arranged rolls having their axes disposed in a plane generally normal to the axes of the chamber whereby the rolls minimize friction of the tube against the chamber and leakage of air into the chamber.

* * * * *